United States Patent

Mifflin et al.

[15] 3,641,433

[45] Feb. 8, 1972

[54] TRANSMITTED REFERENCE SYNCHRONIZATION SYSTEM

[72] Inventors: Ralph W. Mifflin; Joseph P. Wheeler, both of Rome; Joseph T. Massoud, Washington Mills, all of N.Y.

[73] Assignee: The United States of America as represented by the Secretary of the Air Force

[22] Filed: June 9, 1969

[21] Appl. No.: 831,479

[52] U.S. Cl. ....................................325/8, 343/6.5, 325/58, 325/65

[51] Int. Cl. ....................................................H04b 1/59

[58] Field of Search ....................325/8, 9, 10, 39, 42, 58, 65; 343/6.5, 7.3, 7.5, 7.6; 235/181

[56] References Cited

UNITED STATES PATENTS

| | | | |
|---|---|---|---|
| 3,317,838 | 5/1967 | Ham, Jr. | 325/31 |
| 2,607,004 | 7/1952 | Harris | 325/8 X |
| 2,941,202 | 6/1960 | Harris, Jr. et al. | 343/101 |
| 3,337,870 | 8/1967 | Allen et al. | 343/17.5 |
| 3,351,859 | 11/1967 | Groth, Jr. et al | 325/42 |

*Primary Examiner*—Benedict V. Safourek
*Attorney*—Harry A. Herbert, Jr. and George Fine

[57] ABSTRACT

A transmitted reference synchronization system which combines a high process gain transmitted reference communication link with a fixed time delay automatic synchronization technique to allow a correlation process to be accomplished at the origination end of the link with extremely accurate and completely automatic synchronization.

2 Claims, 1 Drawing Figure

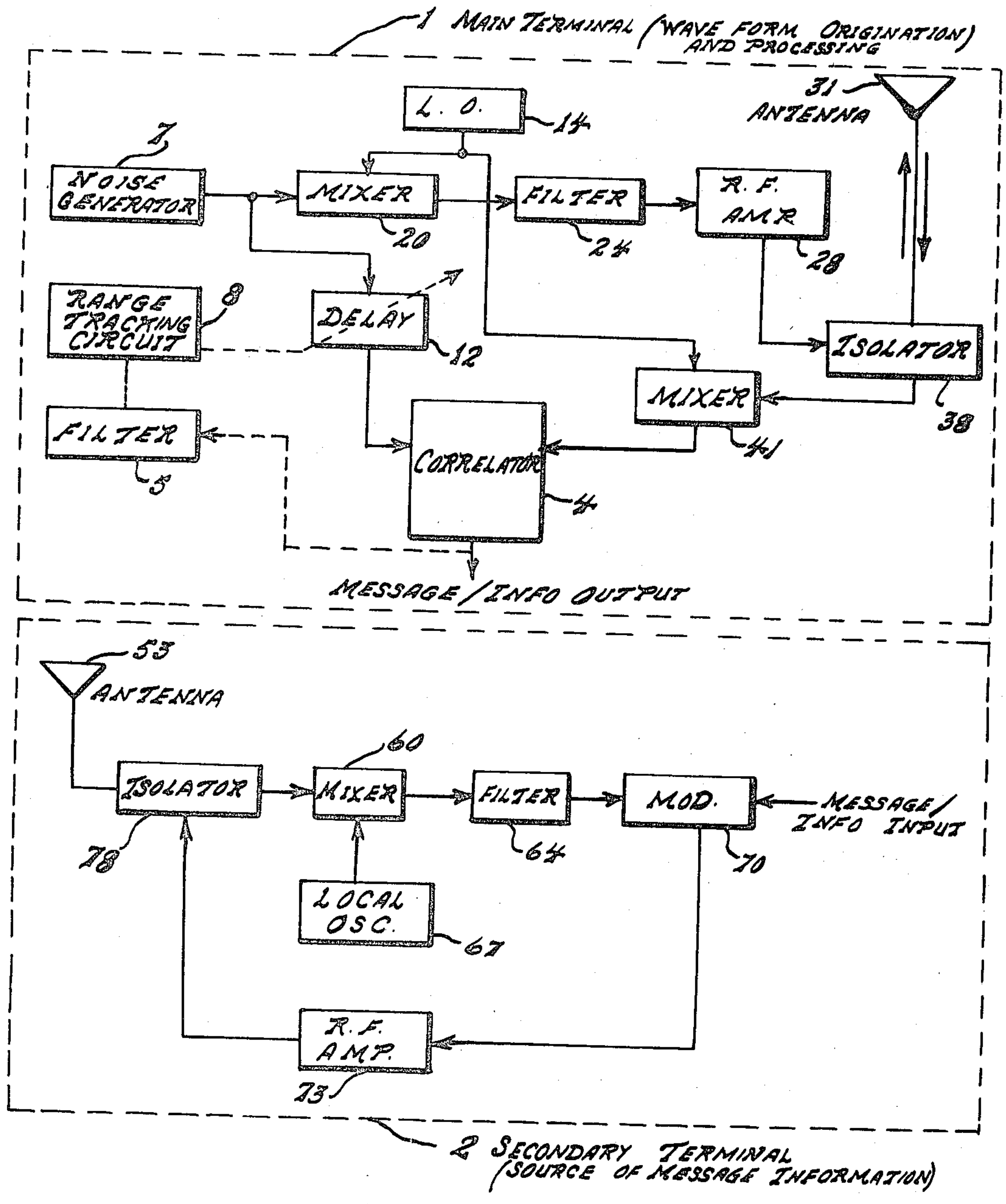
INVENTORS.
RALPH W. MIFFLIN,
JOSEPH P. WHEELER,
JOSEPH T. MASSOUD
BY Harry A. Herbert Jr
George Fine
ATTORNEYS

TRANSMITTED REFERENCE SYNCHRONIZATION SYSTEM

BACKGROUND OF THE INVENTION

This invention relates to a transmitted reference synchronization system and more particularly a system which combines a high process gain transmitted reference communication link with a fixed time delay automatic synchronization system.

The normal method of acquiring synchronization is a bit-by-bit search in the time domain over the time uncertainty (usually several milliseconds) existing in a typical communication link system. This would take at least several minutes and in general several hours to acquire synchronization with typical time uncertainties. This invention eliminates the time-consuming bit-by-bit search required by the present methods. This problem has imposed severe limitations since the origination of spread spectrum systems. Even when parallel processing and/or asynchronous techniques are used to relieve this problem, the time required for synchronization in many cases is still too long to be practical for high process gain system or at least undesirable from both a synchronization time and cost standpoint for medium process gain systems. Also, when these previous methods have been utilized in an attempt to relieve the synchronization problem, their noise immunity has been reduced. This invention eliminates all these problems.

SUMMARY OF THE INVENTION

This invention uniquely combines a high process gain transmitted reference communications link with a fixed time delay automatic synchronization scheme, thereby obtaining all the advantages of both. A basic operation is as follows: a noise or noiselike signal is generated at the origination end of a communications or data link. It is filtered to an appropriate bandwidth then translated to an appropriate RF transmission frequency and transmitted to the other terminal of the link. At this second terminal the noise reference is then modulated with the information, translated to a reasonable offset frequency and retransmitted back to the originating terminal. This system relies on the motion of at least one of the terminals to cause the synchronization to occur. The originally transmitted reference noise signal is delayed at the origination end of the link by some convenient amount and then correlated with the return signal from the second station. This correlation will automatically occur when the relative range between the terminals represents a time difference equal to the delay previously mentioned. Extremely large process gains represented by the TW product of the system, can be easily accomplished with this system and no longtime search for synchronization needs to be accomplished. This search, in essence, is automatically accomplished by the relative motion range change between the two terminals. The combination of a very high time bandwidth product spread spectrum system utilizing the transmitted reference principle in conjunction with the fixed synchronization gate comprise the unique and novel aspects of this invention. This allows the correlation processing to be accomplished at the origination end of the link with extremely accurate and completely automatic synchronization.

An object of the present invention is to provide a transmitted reference synchronization system.

Another object of the present invention is to provide a transmitted reference synchronization system which combines high process gain transmitted reference communications link with a fixed time delay automatic synchronization system.

Yet another object of the present invention is to provide a transmitted reference synchronization system which is a combination of a very high time bandwidth product spread spectrum system utilizing the transmitted reference principle in conjunction with a fixed synchronization gate.

The various features of novelty which characterize this invention are pointed out with particularity in the claims annexed to and forming part of this specification. For a better understanding of the invention, however, its advantages and specific objects obtained with its use, reference should be had to the accompanying drawing and descriptive matter in which is illustrated and described a preferred embodiment of the invention.

BRIEF DESCRIPTION OF THE DRAWING

The single FIGURE of the invention shows a block diagram of a preferred embodiment of the transmitted reference synchronization system of the invention.

DESCRIPTION OF THE PREFERRED EMBODIMENT

One specific embodiment of this invention is comprised of two basic terminals 1 and 2. The first, which we will call the main terminal, is the origination and processing end of the link. Referring to the block diagram, the signal is originated by the noise generator 7. This can be a true noise generator or a pseudorandom generator depending on the particular application and requirements. It is then translated to an appropriate RF frequency by the mixer 20 and the local oscillator 14. After suitable filtering by filter 24 and amplification in the RF amplifier 28, this band-limited RF noise is then fed to the antenna 31 through the isolation circuit 38. The signal then is radiated from the antenna 31 of the main terminal and received at the secondary terminal antenna 53. After passing through suitable isolator circuitry 78 it is translated to an appropriate offset RF frequency by the mixer 60 and the local oscillator 67 and then filtered by filter 64. At this point, the message information is applied to the noise signal by the modulator 70. This can be AM, FM phase modulation, delta modulation or any other type of appropriate modulation for the information and bandwidth of the particular system. After the modulation has been applied, it is amplified in the RF amplifier 73, fed through the isolation circuitry 78 and back to the antenna 53 for retransmission back to the main terminal. When this modulated noise signal is received again at the main terminal it is routed from the antenna 31 back through the isolation circuitry 38 into the receiver mixer circuit 41 and then multiplied in the conventional correlator 4 by the delayed original noise signal called the noise reference. To explain the foregoing assume that noise generator 7 has a frequency bandwidth with a center frequency of 2 megahertz and that local oscillator 14 has a preselected frequency of 10 megahertz. The translated signal would be at 12 megahertz which would then be transmitted to the displaced end. Mixer 60 would receive a 12-megahertz signal and local oscillator 67 would provide a predetermined megahertz signal thus the difference output signal would be 8 megahertz. Now the message modulated signal would be transmitted back to the origination end and would be received by mixer 41 which would also be in receipt of a 10-megahertz signal from L.O. 14. The difference output signal from mixer 41 would be at a frequency of 2 megahertz. Thus correlator 4 would receive a pair of signals, both being at 2 megahertz. Therefore, any conventional noise generator with a conventional frequency bandwidth could be treated in exactly the same fashion to obtain identical frequency inputs to correlator 4. Mixers 20, 41 and 67 are operated as sum and difference components so that the inputs to correlator 4 are at the same frequency. When the distance between the two terminals represents an amount whose propagation time equals the delay previously set into the reference at delay 12 the waveforms will match exactly except for the message information, and only the message or information will remain as an output signal at the main terminal. This will only occur if the delay due to propagation between the two terminals equals the delay which is set into the reference in the main terminal at delay 12 accurate to within the correlation peak of the waveform being utilized. This correlation peak width in general is equal to one over the bandwidth of the noise reference. The operation of the system then is as follows: a message is to be transmitted from the secondary terminal to the main terminal. It may be continuously repeated and fed into the modulator 70 of the secondary terminal. One or both of the terminals must be moving so that the relative distance between the two terminals is changing so that the propagation time is getting closer to the delay which is set into the main terminal reference. Synchronization of the delayed stored reference and the transmitted reference signal which has been modulated will occur automatically when the range propagation delay equals the stored delay. The message or information will then be received out of the correlator 4.

In many cases the width of the correlation peak and the required process gain can be adapted so that the time within the correlation peak, as the terminals are moving relative to each other, is long enough for several complete repetitions of the message. In cases where the process gain must be very high, the relative motion of the terminals so rapid, and the length of the message long, waveforms will pass by each other through the useful part of the correlation peak before the message is completely received. In these cases, a tracking circuit can be implemented to continuously adjust the delay 12 in the proper direction for a duration adequate to receive several redundant repetitions of the message. This tracking circuit would be activated when the correlation peak was first received as the result of the terminals arriving at the initial range setting. This additional circuitry is shown in the main terminal block diagram by the dotted lines and arrows and consists of filter 5 and the range-tracking circuit 8. These circuits utilize standard off-the-shelf equipments using state of the art range-tracking techniques. A voltage-variable delay would then be required for the delay 12 for delaying the reference. Another alternative is to use several correlators and adjacent range cell delays stacked to handle a long message without resorting to a range-tracking circuit. Neither of these techniques were required for the experimental reduction to practice and are only included to show possible adaptations of this basic invention to satisfy varying system requirements.

What is claimed is:

1. A transmitted reference synchronization system for a link having an origination end and a second end displaced therefrom wherein one of the ends of the link is in constant motion in relation to the other end comprising means to generate a noise signal at said origination end, first means to translate said noise signal to a preselected RF transmission frequency to provide a first translated signal, said first translating means consisting of a local oscillator providing a preselected frequency signal and a first mixer simultaneously receiving said noise signal and said preselected frequency signal, first antenna means located at said origination end to transmit said first translated signal toward said second end, second antenna means located at said second end receiving the transmitted first translated signal to provide a first received signal, second means to translate said first received signal to a predetermined offset RF frequency to provide a second translated signal, means to modulate said second translated signal with an information signal to provide a modulated noise signal, said modulated noise signal being transmitted by said second antenna means for reception by said first antenna means to provide a second received signal, a second mixer receiving simultaneously with second received signal and said preselected frequency signal to provide an output signal for correlation purposes, means at said origination end to delay said noise signal a predetermined period to provide a delayed noise signal, and means to correlate said delayed noise signal with said output signal, the correlation occurring automatically when the relative range between said origination and second ends of said link represents a time difference equal to the delay.

2. A transmitted reference synchronization system as described in claim 1 including first means to filter the first translated signal to a predetermined bandwidth prior to transmittal thereof, and second means to filter the second translated signal prior to transmittal thereof.

* * * * *